US012793007B2

(12) United States Patent
Messner

(10) Patent No.: US 12,793,007 B2
(45) Date of Patent: Nov. 10, 2026

(54) METHOD FOR STORING A PLURALITY OF STORAGE OBJECTS OF DIFFERENT STORAGE-OBJECT TYPES IN A STORAGE RACK UNIT, AND A RACK STORAGE SYSTEM FOR THIS PURPOSE

(71) Applicant: TGW LOGISTICS GMBH, Marchtrenk (AT)

(72) Inventor: Gerhard Messner, Linz (AT)

(73) Assignee: TGW LOGISTICS GMBH, Marchtrenk (AT)

( * ) Notice: Subject to any disclaimer, the term of this patent is extended or adjusted under 35 U.S.C. 154(b) by 358 days.

(21) Appl. No.: 18/262,789

(22) PCT Filed: Jan. 27, 2022

(86) PCT No.: PCT/AT2022/060025

§ 371 (c)(1),
(2) Date: Jul. 25, 2023

(87) PCT Pub. No.: WO2022/159999

PCT Pub. Date: Aug. 4, 2022

(65) Prior Publication Data

US 2024/0095664 A1 Mar. 21, 2024

(30) Foreign Application Priority Data

Jan. 29, 2021 (AT) .............................. A 50054/2021

(51) Int. Cl.
*G06Q 10/087* (2023.01)

(52) U.S. Cl.
CPC .................................. *G06Q 10/087* (2013.01)

(58) Field of Classification Search
CPC ... G06Q 10/087; B65G 1/1371; B65G 1/0407
(Continued)

(56) References Cited

U.S. PATENT DOCUMENTS

| | | | |
|---|---|---|---|
| 9,818,002 | B1 | 11/2017 | Yunes et al. |
| 10,173,839 | B2 | 1/2019 | Ahammer et al. |

(Continued)

FOREIGN PATENT DOCUMENTS

| | | | |
|---|---|---|---|
| AT | 522434 | A4 | 11/2020 |
| CN | 110120121 | A | 8/2019 |

(Continued)

OTHER PUBLICATIONS

International Search Report & Written Opinion of corresponding International Application No. PCT/AT2022/060025; mailed Aug. 4, 2022, 13 pages.

*Primary Examiner* — Russell S Glass
(74) *Attorney, Agent, or Firm* — FisherBroyles, LLP; Douglas P. LaLone

(57) ABSTRACT

A method for storing multiple storage objects of different storage-object types in a storage rack, wherein multiple storage region segmentations with multiple virtual receiving locations for the storage objects are assigned to a storage region. During the storing of a storage object, a matching virtual receiving location is selected in the storage region segmentations and the storage object is stored on the assigned physical receiving location of the storage region. Subsequently, the virtual receiving locations in the storage region segmentations assigned to the storage region are limited to virtual receiving locations which enable a storage of another storage object. Furthermore, a rack storage system for carrying out said method is specified.

15 Claims, 9 Drawing Sheets

Figure 1:
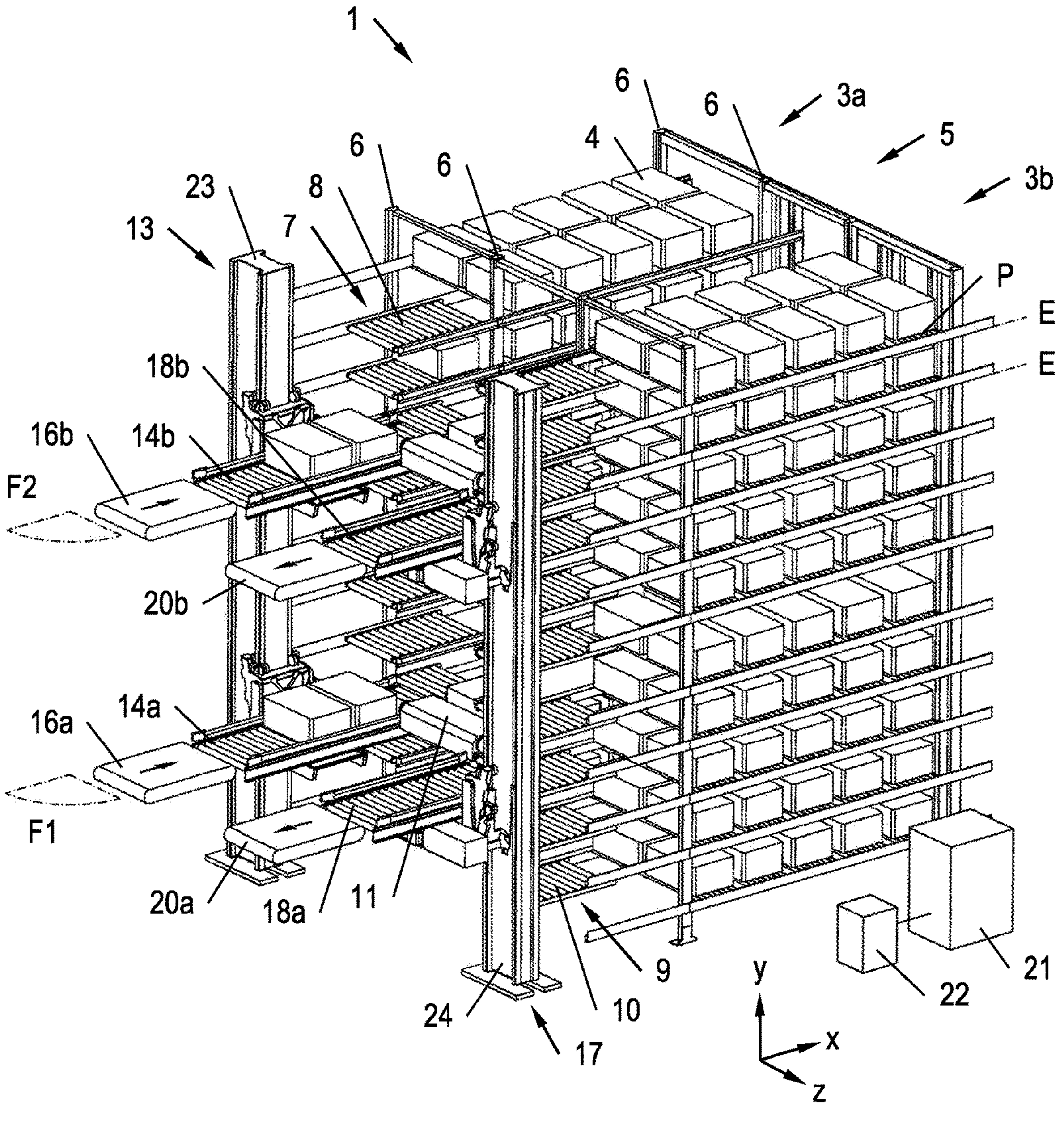

(58) Field of Classification Search
USPC .......................................................... 705/28
See application file for complete search history.

(56) References Cited

U.S. PATENT DOCUMENTS

| | | | | |
|---|---|---|---|---|
| 10,710,803 | B2 | 7/2020 | Grosse et al. | |
| 2004/0133483 | A1* | 7/2004 | Potter | G06Q 10/087 705/28 |
| 2015/0266672 | A1* | 9/2015 | Lert | B65G 1/0492 700/214 |
| 2021/0395015 | A1 | 12/2021 | Ahammer et al. | |
| 2022/0402699 | A1 | 12/2022 | Schauer et al. | |

FOREIGN PATENT DOCUMENTS

| | | | | | |
|---|---|---|---|---|---|
| CN | 110902246 | A | | 3/2020 | |
| CN | 112101859 | A | | 12/2020 | |
| CN | 112163651 | A | | 1/2021 | |
| DE | 20011661 | U1 | | 12/2000 | |
| DE | 102004025070 | A1 | * | 12/2005 | B65G 1/1376 |
| DE | 102004046176 | A1 | * | 4/2006 | B65G 1/1375 |
| DE | 102015213546 | A1 | | 1/2017 | |
| EP | 1564160 | A1 | | 12/1925 | |
| EP | 2065317 | A1 | | 12/1936 | |
| EP | 1598291 | A2 | | 11/2005 | |
| EP | 1627830 | A1 | | 2/2006 | |
| JP | S60137705 | A | | 7/1985 | |
| JP | H0248314 | A | | 2/1990 | |
| JP | H07309406 | A | | 11/1995 | |
| JP | 2005138954 | A | | 6/2005 | |
| JP | 2005138955 | A | | 6/2005 | |
| JP | 2013170079 | A | * | 9/2013 | G06Q 10/087 |
| WO | 2013090970 | A2 | | 6/2013 | |
| WO | 2016033628 | A1 | | 3/2016 | |
| WO | WO-2016141395 | A1 | * | 9/2016 | B65G 1/0421 |
| WO | 2016168878 | A1 | | 10/2016 | |
| WO | 2020113249 | A1 | | 6/2020 | |
| WO | 2020113254 | A1 | | 6/2020 | |

* cited by examiner

METHOD FOR STORING A PLURALITY OF STORAGE OBJECTS OF DIFFERENT STORAGE-OBJECT TYPES IN A STORAGE RACK UNIT, AND A RACK STORAGE SYSTEM FOR THIS PURPOSE

CROSS REFERENCE TO RELATED APPLICATIONS

This application is the National Stage of PCT/AT2022/060025 filed on Jan. 27, 2022, which claims priority under 35 U.S.C. § 119 of Austrian Application No. A 50054/2021 filed on Jan. 29, 2021, the disclosure of which is incorporated by reference.

BACKGROUND OF THE INVENTION

1. Field of the Invention

The invention relates to a method for storing multiple storage objects of different storage-object types in a storage rack, which comprises uprights, rack levels located on top of one another and a plurality of storage regions. Here, the storage regions are respectively arranged between two uprights spaced apart in a longitudinal direction of the storage rack, and a storage of the storage objects is controlled by a warehouse management system, to which an electronic memory is allocated. The invention further relates to a rack storage system with at least one storage rack for receiving multiple storage objects of different storage-object types, which has wherein the at least one storage rack comprises uprights, rack levels located on top of one another and a plurality of storage regions, wherein the storage regions are respectively arranged between two uprights. In addition, the rack storage system comprises at least one storage and retrieval unit for storing the storage objects, which is displaceable in a longitudinal direction of the storage rack, and a warehouse management system, to which an electronic memory is allocated.

2. Description of the Related Art

Such a rack storage system and an operating method for such a rack storage system are known from the prior art.

For example, a method for storing storage objects is known from US 2015/0266672 A1, wherein a size is respectively variably adjusted for a plurality of storage regions. Each variable storage region defined in this context is assigned to a different storage object.

Further, a storage system for storing storage objects is known from EP 1 627 830 A1, wherein a size of the storage objects is acquired. Here, information on vacant locations is deposited in an electronic memory in the storage system. Furthermore, multiple storage objects are grouped into storage-object groups based on their size, and the storage-object groups are respectively assigned a suitable vacant location.

However, the known methods are disadvantageous in that the storage of storage objects of different storage-object types, in particular of storage objects of different sizes, is difficult to the extent that future effects on the storage strategy that are caused by the storage of a storage object can be assessed only with difficulty, or are not taken into account at all. This may result in unfavorable situations when successively filling a rack storage system and/or one or multiple storage racks. Specifically, it may happen that a storage object cannot be stored due to an unfavorable filling of the rack storage system, which storage object could be stored in case of a favorable filling of the rack storage system and/or of one or multiple storage racks with the same filling level.

SUMMARY OF THE INVENTION

It is one object of the invention to specify an improved method for storing multiple storage objects of different storage-object types in a storage rack, and an improved rack storage system for this purpose. In particular, a rack storage system is to be filled in such a way that a storage of other storage objects is supported and/or facilitated.

The object of the invention is achieved with a method of the kind mentioned in the beginning, which comprises the following steps:

a) assigning multiple storage region segmentations to a storage region of the storage regions in the electronic memory of the warehouse management system for the plurality of storage regions, wherein the storage region segmentations respectively comprise a plurality of virtual receiving locations for the storage objects and specify a possible arrangement of the storage-object types inside said storage region,
b) acquiring the storage-object type of a storage object to be stored,
c) selecting a virtual receiving location for the storage object to be stored in the plurality of storage region segmentations by the warehouse management system, wherein the virtual receiving location enables the storage of the storage-object type of said storage object,
d) storing the storage object on a physical receiving location of the storage region which is assigned to the selected virtual receiving location by a storage and retrieval unit displaceable in a longitudinal direction of the storage rack,
e) changing a status of the virtual receiving location in the electronic memory, which specifies whether the assigned physical receiving location is occupied by a storage object, from unoccupied (vacant) to occupied,
f) limiting the virtual receiving locations in the storage region segmentations assigned to the storage region to virtual receiving locations which enable the storage of another storage object on a physical receiving location, in the electronic memory,
g) repeating the steps b) to f).

The object of the invention is also achieved with a rack storage system of the kind mentioned in the beginning, in which the warehouse management system is configured for executing the following steps:

a) assigning multiple storage region segmentations to a storage region of the storage regions in the electronic memory of the warehouse management system for the plurality of storage regions, wherein the storage region segmentations respectively comprise a plurality of virtual receiving locations for the storage objects and specify a possible arrangement of the storage-object types inside said storage region,
b) acquiring the storage-object type of a storage object to be stored,
c) selecting a virtual receiving location for the storage object to be stored in the plurality of storage region segmentations, wherein the virtual receiving location enables the storage of the storage-object type of said storage object,
d) controlling the storage and retrieval unit for the purpose of storing the storage object on a physical receiving location of the storage region which is assigned to the selected virtual receiving location, e) changing a status of the virtual receiving location in the electronic memory, which specifies whether the assigned physical receiving location is occupied by a storage object, from unoccupied (vacant) to occupied, f) limiting the virtual receiving locations in the storage region segmentations assigned to the storage region to virtual receiving locations which enable the storage of another storage object on a physical receiving location, in the electronic memory, g) repeating the steps b) to f).

A "physical receiving location" is defined by a horizontal receiving surface, which is tentered in an x-direction (parallel to the longitudinal direction of the storage rack) and in a z-direction (perpendicular to the longitudinal direction of the storage rack) between the uprights, in particular two front uprights and two rear uprights. Therefore, a "physical receiving location" is a two-dimensional receiving location.

Yet, alternatively, it is also possible that a "physical receiving location" is defined by a horizontal receiving surface, which is tentered in an x-direction (parallel to the longitudinal direction of the storage rack) and in a z-direction (perpendicular to the longitudinal direction of the storage rack) between the uprights, in particular two front uprights and two rear uprights, and a height extending in a y-direction (vertically to the receiving surface). Therefore, a "physical receiving location" is a three-dimensional receiving location.

A "virtual receiving location" is the digital copy and/or the digital image of the respective physical receiving location.

The proposed measures facilitate and/or support the storage of storage objects of different storage-object types, in particular of storage objects of different sizes, in an optionally already partially filled rack storage system and/or in one or multiple already partially filled storage racks. This is achieved by selecting, during a storage of a storage object, a favorable virtual receiving location in a storage region segmentation which takes future effects on the storage strategy into account. This ensures that the rack storage system and/or the one or the multiple storage racks can be operated such that, even with a high filling level, a possibility of storing other storage objects of different storage-object types is ensured at all times.

Here, it may in particular be provided that a first storage object is stored on a first receiving location in the storage region in accordance with a first storage region segmentation and, subsequently, a second storage object is stored on a second receiving location in the same storage region in accordance with a second storage region segmentation. The combination of different storage region segmentations in the same storage region helps achieve a particularly efficient use of space in the storage region.

The limiting of the virtual receiving locations in step f) involves marking essentially at least those virtual receiving locations in the different storage region segmentations as "occupied" which are affected by the storage in step d), so that these are subsequently no longer accessible, for example because the corresponding physical receiving location in the storage region is at least partially occupied. Equally, a virtual receiving location is affected by the storage in step d) if the storage object, in case of multiple receiving locations located one behind another, is stored on a front receiving location, as the receiving location(s) located behind it, while not physically occupied, is/are no longer accessible. In this case, the status of the receiving locations located behind it can also be changed to "occupied."

It is advantageous if virtual receiving locations are released again when a storage object to be retrieved is retrieved from its physical receiving location. For this purpose, it may be provided that, during a retrieval operation of the storage object to be retrieved from its physical receiving location, the status of the virtual receiving location assigned to the physical receiving location is changed from occupied to unoccupied. Further, it is preferably provided here that the limiting of the virtual receiving locations, which was executed in step f) during a preceding storage of the storage object to be retrieved, is reversed.

The storage-object type specifies, in particular, the size of a storage object in one, two and/or three dimensions (length dimension, measured in z-direction, width dimension, measured in x-direction, and/or height dimension, measured in y-direction). Further, the storage-object type can comprise other properties of the storage object, for example whether it is (an) article(s) directly or a loading aid, with which (an) article(s) is/are transported, whether it is a fast mover or a slow mover, and so forth. A receiving location, which enables the storage of a storage object, or of a storage-object type, is of the same size as the storage object, or the storage-object type, or, in particular slightly, larger than the storage object, or the storage-object type. The article(s) is/are a single article or a packing unit comprising multiple single articles (and enveloped by a plastic foil, for example). The loading aid is, for example, a container, a tray, a cardboard box etc.

Preferably, the rack storage system comprises a sensor system for reading a data carrier, for example a barcode, and/or a sensor system for acquiring the storage-object type, for example dimensions of the storage object, and/or a sensor system for identifying the storage-object type by object recognition, in order to determine a storage object on that basis.

The storage-object type assigned to a storage object is deposited, for example, in master data of the storage object.

For this purpose, it proves favorable, according to a first embodiment, if the acquiring of the storage-object type is done by an identification of the storage object. The identification of the storage object can be done, for example, by reading out a data carrier by a sensor system, in particular by a reader. The data carrier is, for example, a barcode, a matrix code, in particular a QR code (quick-response code), a data-matrix code, an RFID (radio-frequency identification) tag, or suchlike. The reader can be an optical or optoelectronic reader, with which the data can be machine-read. The data carrier may contain data, in particular an identification number, on the basis of which the master data, in which the storage-object type of the storage object is stored, can be accessed. Alternatively, the data carrier may also directly contain the data relating to the storage-object type.

For this purpose, it proves of advantage, according to a second embodiment, if the acquiring of the storage-object type is done by identifying the storage object with a sensor system for object recognition. Object recognition describes a method for identifying an object by optical, acoustic or other physical identification methods. In particular, after identifying the storage object by object recognition, the master data, in which the storage-object type of the storage object is stored, can be accessed.

Independent of the described embodiments, the acquiring of the storage-object type may alternatively comprise an acquiring of the dimensions of the storage object by a sensor system in order to acquire, in particular, a length, width and/or height and/or a size in one, two and/or three dimensions of the storage object. The sensor system comprises, in particular, an optical sensor system. The storage-object type of the respective storage object results from the acquired size in one, two and/or three dimensions of the storage object.

It should further be noted that the steps d), e) and f) need not imperatively be executed in the specified sequence but can also be executed in a different order, for example in the sequence e)→d)→f) or e)→f)→d) or d)→f)→e).

A storage and retrieval unit that can be operated in an automated, partially automated or manual manner may be provided for the method.

Storage and retrieval units that generally come into consideration are both rail-guided single-level storage and retrieval units and rail-guided multi-level storage and retrieval units or (non-rail-guided) autonomous storage and retrieval units, such as one or multiple AMR (autonomous mobile robot) or one or multiple AGV (automated guided vehicle), respectively with a jointed-arm robot and suchlike. Furthermore, storage and retrieval units that also come into consideration are storage and retrieval units that are displaceable by an operator, such as, for example, forklifts or suchlike.

Advantageous designs and further advancements of the invention result from the subclaims as well as from the description in combination with the figures.

It is favorable if the limiting of the virtual receiving locations in step f) comprises a limiting of the storage region segmentations assigned to the storage region to one or multiple storage region segmentation(s) which include the selected virtual receiving location in the electronic memory. In other words, the limiting of the virtual receiving locations in step f) comprises a limiting of the storage region segmentations assigned to the storage region to one or multiple storage region segmentation(s) in the electronic memory, wherein the remaining storage region segmentation(s) include the selected virtual receiving location. Therefore, a number of available storage region segmentations can be reduced as the filling level of the respective storage region increases, whereby, upon another storing of another storage object, the selection of a virtual receiving location can be done particularly efficiently.

It is advantageous if the step f) is executed in the same manner for other storage regions, in particular for adjacent and/or opposite storage regions. This means that the storage region segmentations are limited not only for the storage region on which a storage object has just been stored but also for others, on which no storage object at all has currently been stored. In this manner, receiving locations in an adjacent storage region which enable the simple rearranging of storage objects, for example, can be kept vacant. In particular, the embodiment variant relates to storage regions located opposite each other in a rack aisle. This means that step f) can be executed in the same manner for a storage region located opposite in the rack aisle.

Furthermore, it may be advantageous if, as a criterion for the selection of a virtual receiving location in step c), a maximum number of virtual receiving locations which remain after the limiting of the virtual receiving locations in step f) is provided. This results in a high storage capacity with respect to the number of other storage objects to be stored. This means that many storage objects can yet be stored in the storage region.

It is further advantageous if, as a criterion for the selection of a virtual receiving location in step c), a maximum number of storage region segmentations which remain after the limiting of the storage region segmentations assigned to the storage region in step f) is provided. This results in a high flexibility for the storage of other storage objects because many different storage region segmentations can then still be selected from.

In a favorable variant of the proposed method, the selection of a receiving location can be done according to one or multiple of the following criteria: turnover rate of the storage object, even occupation of the rack storage system (therefore of the one or of the multiple storage racks) by storage objects, accumulation of storage objects of the same, or of a similar, storage-object type, filling level in a storage object configured as a loading aid, filling level of a (physical) storage region, separation of a hazardous good from non-hazardous storage objects, transport route of a storage object from a receiving location to a delivery device, wherein the storage object is transported on said transport route using the storage and retrieval unit, transport route of a storage object from a receiving device to a receiving location, wherein the storage object is transported on said transport route using the storage and retrieval unit, prioritization of rear (virtual/physical) receiving locations in case of multiple (virtual/physical) receiving locations located one behind another, prioritization of larger front (virtual/physical) receiving locations in case of multiple (virtual/physical) receiving locations located one behind another, minimization of the time required for storing by the storage and retrieval unit, maximization of the number of the storage objects stored at a time by the storage and retrieval unit.

In the above-mentioned measures, the receiving device may relate to the storage operation and, in the case of a single-level storage and retrieval unit, for example to a buffer device with a plurality of provisioning devices, wherein a storage and retrieval unit can pick up at least one storage object from each provisioning device. In the above-mentioned measures, the delivery device may relate to the retrieval operation and, in the case of a single-level storage and retrieval unit, for example to a buffer device with a plurality of provisioning devices, wherein a storage and retrieval unit can deliver at least one storage object to each provisioning device.

In the above-mentioned measures, the receiving device may relate to the storage operation and, in the case of a multi-level storage and retrieval unit, for example to a buffer device with a (single) provisioning device, wherein a storage and retrieval unit can pick up at least one storage object from the provisioning device. In the above-mentioned measures, the delivery device may relate to the retrieval operation and, in the case of a multi-level storage and retrieval unit, for example to a buffer device with a (single) provisioning device, wherein a storage and retrieval unit can deliver at least one storage object to the provisioning device. A storage conveying system comprises a conveying device for transporting conveying objects to be stored, which forms the provisioning device. A retrieval conveying system comprises a conveying device for transporting conveying objects to be retrieved, which forms the provisioning device.

For example, fast movers (A-Articles) may be stored rather in the vicinity of a vertical conveying device for storing conveying objects and/or retrieving conveying objects, whereas slow movers (C-Articles) are stored rather further away from the vertical conveying device for storing conveying objects and/or retrieving conveying objects. Further, the rear receiving locations may rather be occupied by slow movers (C-Articles) if a storage region has multiple receiving locations located one behind another and/or multiple conveying objects are deposited in a storage rack one behind another (in z-direction), the front ones rather by fast movers (A-Articles). If a storage region has multiple receiving locations located one behind another and/or multiple conveying objects are deposited in a storage rack one behind another (in z-direction), these receiving locations may preferably be occupied by storage objects of the same, or of a similar, storage-object type.

It is furthermore advantageous if one or multiple of the above-mentioned criteria are taken into account during a rearranging operation, in which already-stored storage objects are rearranged to another receiving location, wherein the steps b) to f) are executed after the removal of a storage object from its original receiving location and during the storing on the other receiving location. This means that, during the rearranging of a storage object, the same measures are taken as during the storing of a storage object. The rearranging, therefore, comprises a retrieving of a storage object to be rearranged from its original receiving location and a subsequent storing of the storage object to be rearranged on the other receiving location. The initial storing and the repeated storing of a storage object during the rearranging, therefore, follow a uniform principle, whereby the proposed method is put to efficient use. For example, such a rearranging operation can be executed at times of low capacity utilization of the rack storage system, for example during the night.

It may further be provided that, during the rearranging of a storage object, the virtual, or physical, receiving location is selected so as to optimize a route, so that a transport route between the original receiving location of the storage object to a receiving location selected for the rearranging is as short as possible. This can be advantageous, in particular, whenever the storage object is to be stored on the selected receiving location for a short term only.

Advantageously, the steps b) to f) are executed for multiple storage objects at a time and/or simultaneously, wherein the storage objects are stored in one or multiple storage region segmentation(s) in step c) and in a single storage region in step d). This variant is of advantage whenever more than one storage object can be stored by the storage and retrieval unit in one step and/or in a single storage operation. Here, it may be provided that a first storage object is stored on a first receiving location in the storage region in accordance with a first storage region segmentation and a second storage object is stored on a second receiving location in the storage region in accordance with a second storage region segmentation, essentially at the same time.

Here, it is favorable if the receiving locations of the storage objects are arranged one behind another in a storage direction, viewed from the storage and retrieval unit. In this manner, during the storage operation, the storage and retrieval unit can deliver multiple storage objects at one position in the storage rack without intermediate travel movements.

It is further particularly advantageous if multiple storage region segmentations are combined to a meta segmentation, wherein, in step c), a virtual receiving location is first selected in the plurality of meta segmentations and a virtual receiving location is then selected in the plurality of storage region segmentations of the selected meta segmentation, and in step f), the meta segmentations assigned to the storage region are limited, in the electronic memory, to one or multiple meta segmentation(s) which include the selected virtual receiving location.

This helps expedite the search for a suitable segmentation. Specifically, if the number of the storage region segmentations assigned to a storage region becomes very large, the search for a suitable virtual receiving location, or the selection of a suitable virtual receiving location, for a storage object can be time-consuming. Therefore, it is of advantage in such a case to form meta segmentations, i.e. groups of the storage region segmentations. Here, the groups are formed, for example, according to the existence of specific virtual receiving locations. For example, a first meta segmentation may include different virtual receiving locations than a second meta segmentation. If a virtual receiving location suitable for a storage object is to be selected in step c), the search in the meta segmentations will be started. Accordingly, matching meta segmentations that have such a virtual receiving location are determined in a first step. Subsequently, the search is continued (only) in the storage region segmentations that are included in the determined meta segmentations. Accordingly, the search for a suitable virtual receiving location for a storage object is cut short, as not the entire number of storage region segmentations need be searched. The meta segmentations can have mutually exclusive storage region segmentations and/or form intersecting regions.

It is also of advantage if the storage region segmentations assigned to a storage region are sorted and/or prioritized on the basis of a sorting criterion, and, in step c), the storage region segmentation is selected that includes the selected virtual receiving location and has the highest priority. The proposed measures ensure that the selection of a matching storage region segmentation can be done particularly efficiently. A sorting criterion may be, for example, the number of the receiving locations contained in a storage region segmentation, wherein the priority increases with the number of the receiving locations. Accordingly, if possible, those storage region segmentations are selected in which as many (virtual) receiving locations as possible remain vacant after the occupation of a receiving location by the storage object to be stored. In particular, also one, or multiple, of the criteria disclosed further above can be used.

It is further favorable if the receiving location which offers the best use of space by the storage object is selected in step c). A storage object is regularly smaller than the physical receiving location on which it is stored. It is advantageous if the space not occupied by the storage object is as small as possible. Here, the term "use of space" may refer either to the use of a one-dimensional width, a one-dimensional depth, a one-dimensional height, a two-dimensional receiving surface or a three-dimensional space.

It may finally be favorable if the limiting of the virtual receiving locations in the rack system in step f) comprises a limiting of the storage region segmentations assigned to the storage region to one or multiple storage region segmentation(s) which include the selected virtual receiving location, in the electronic memory.

It should generally be noted that the storage objects can optionally also be stacked on top of one another. In case of two-dimensional virtual receiving locations, the limit of these receiving locations extends upwards, whereas the segmentation of three-dimensional virtual receiving locations may look different in different planes.

It should also generally be noted that, while the use of rectangular and/or cuboid virtual receiving locations and physical receiving locations is of advantage in most applications, the virtual receiving locations and physical receiving locations may have any configuration with respect to their shape. Preferably, a shape of the virtual receiving locations corresponds to a base area and/or shape of the storage objects to be stored. Often, storage objects, for example boxes, trays, cardboard boxes and suchlike, have a rectangular shape. In special applications, for example in the case of round and/or circular storage objects, the use of circular and/or cylindrical virtual receiving locations and physical receiving locations may be advantageous.

Furthermore, also one-dimensional virtual receiving locations and/or physical receiving locations may be provided, wherein the one-dimensional receiving locations essentially specify a width (in x-direction) or a length (in z-direction) which enables the storing of a storage object.

It should also be noted in this context that the variants and advantages disclosed in relation to the method presented equally relate to the rack storage system presented, and vice versa.

For the purpose of better understanding of the invention, it will be elucidated in more detail by the figures below.

Figure 2:
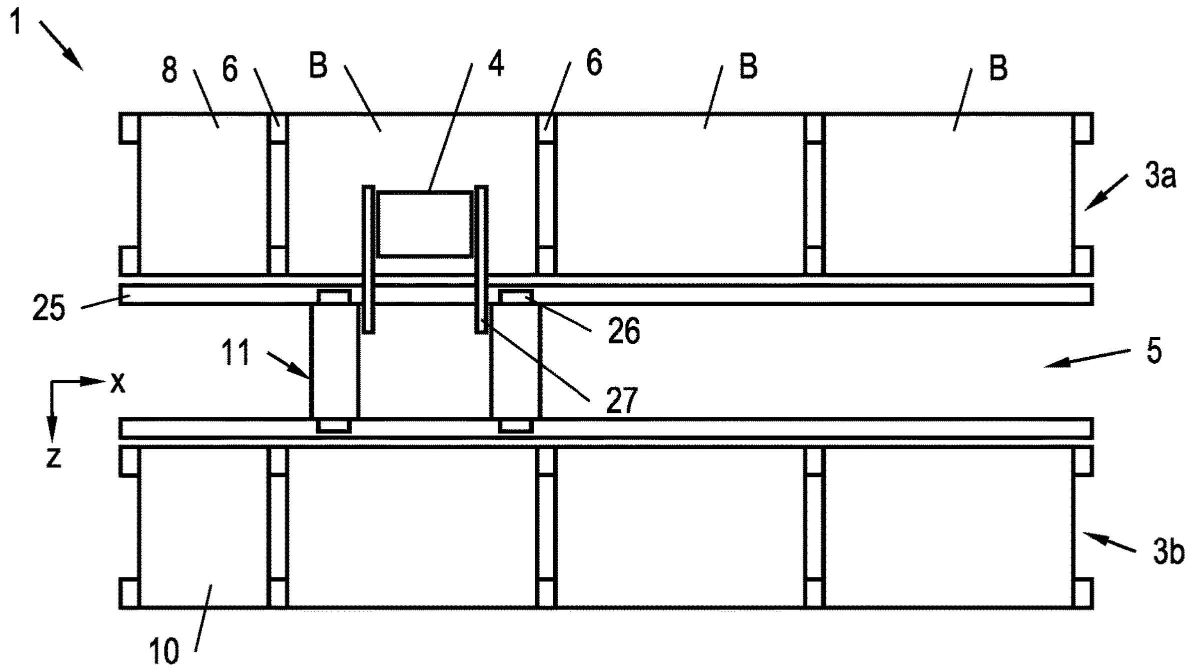
Figure 3:
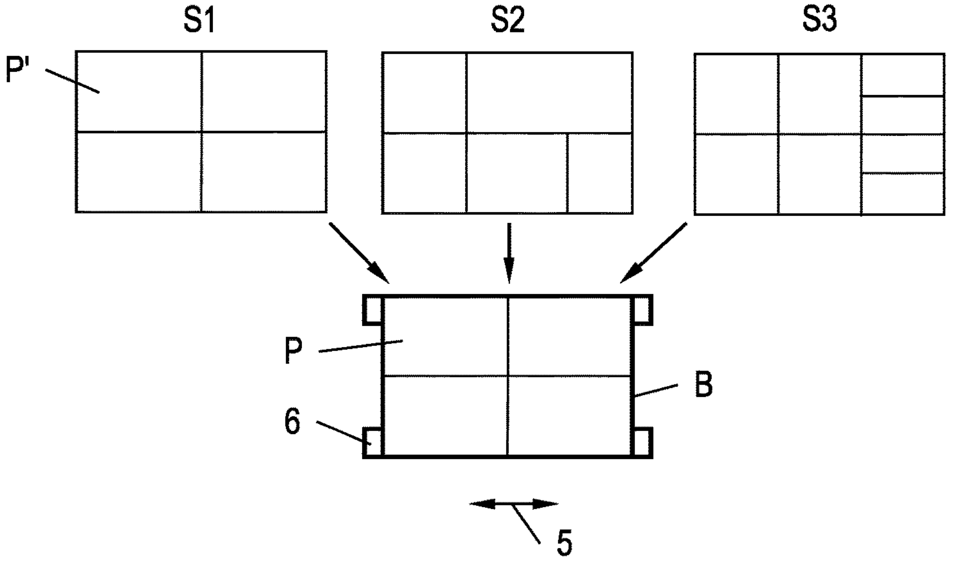
Figure 10:
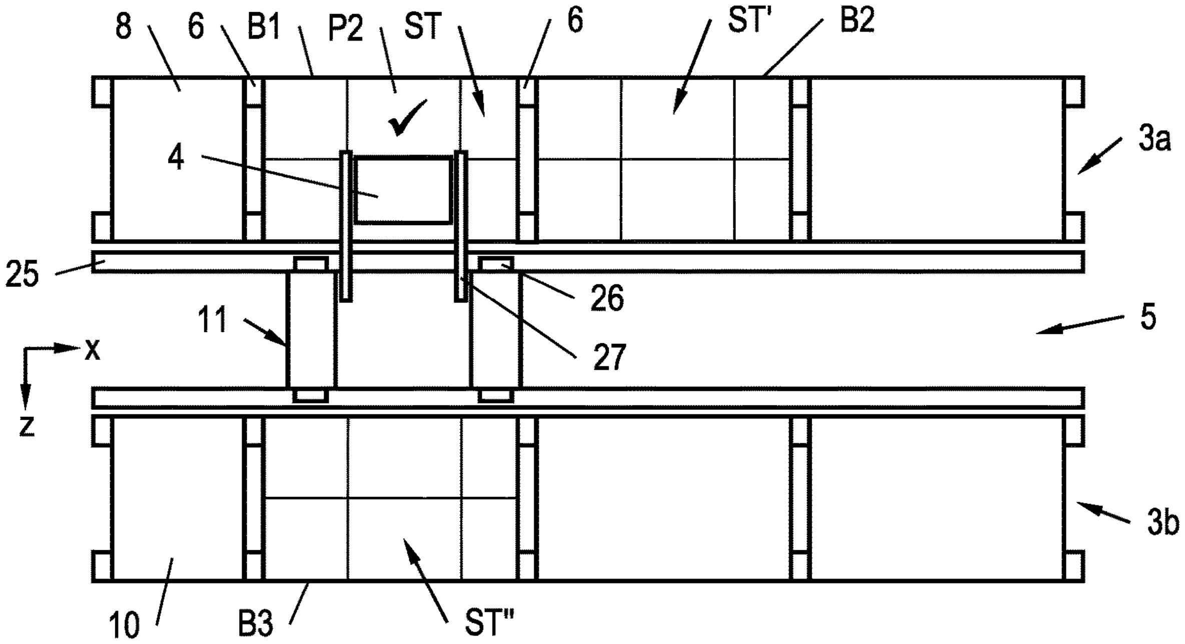
Figure 11:
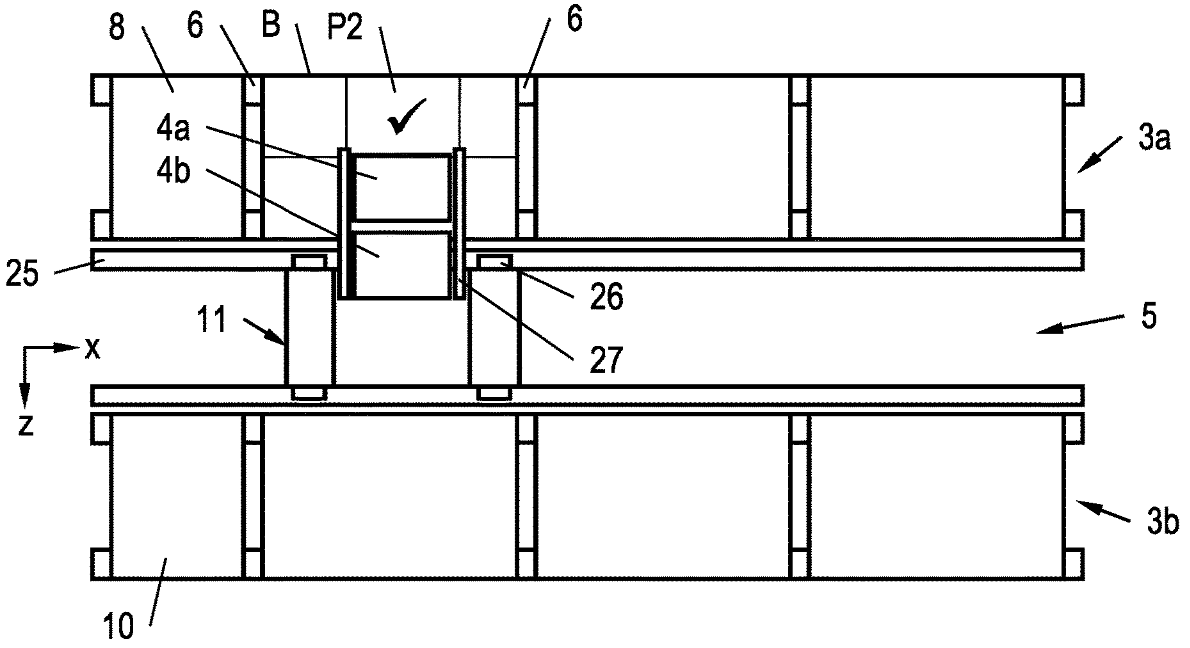
Figure 12:
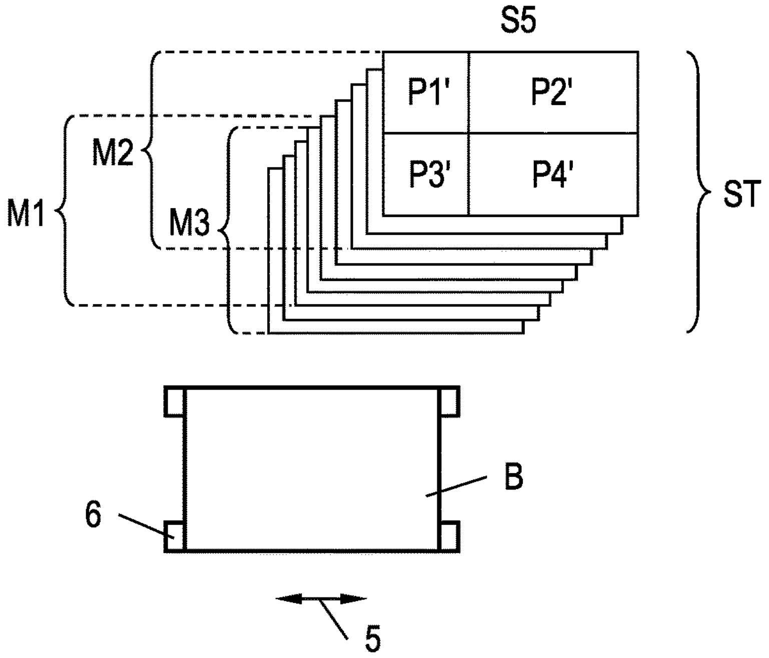
Figure 13:
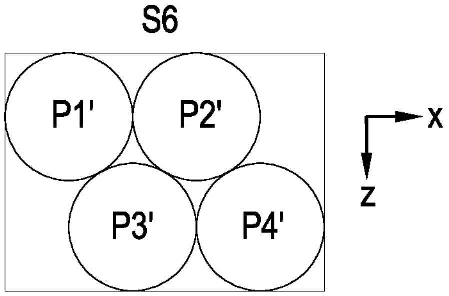

These show in a respectively very simplified schematic representation:

FIG. 1 a smaller section from a rack storage system with schematically represented storage racks in an oblique view;

FIG. 2 a larger section from the rack storage system according to FIG. 1 in a top view of a rack level;

FIG. 3 the assignment of multiple storage region segmentations to a storage region;

FIGS. 4-9*b* an exemplary procedure for storing two storage objects in a storage region;

FIG. 10 a simultaneous and homogeneous limitation of storage region segmentations for multiple storage regions;

FIG. 11 a simultaneous storage of two storage objects on receiving locations located one behind another;

FIG. 12 a use of meta segmentations in the selection of a virtual receiving location; and FIG. 13 an example of a storage region segmentation for round receiving locations.

DETAILED DESCRIPTION OF PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows an example of a rack storage system 1 operated in an automated manner, in an oblique view. According to the embodiment shown, the rack storage system 1 comprises a first storage rack 3*a* for receiving multiple storage objects 4 of different storage-object types, a second storage rack 3*b* for receiving multiple storage objects 4 of different storage-object types and a rack aisle 5 between the first storage rack 3*a* and the second storage rack 3*b*. The storage racks 3*a*, 3*b* respectively comprise vertical uprights 6, multiple rack levels E located on top of one another, and storage regions B arranged in the rack levels E, wherein the storage regions B are respectively arranged between two uprights 6. The vertical uprights 6 can comprise front uprights and rear uprights. Generally, a rack level E can be formed by crossbars and/or support bars running in z-direction, or a compartment shelf or a grid shelf. In FIG. 1, only one storage region B per rack level E is represented for better clarity. Usually, however, there is a plurality of storage regions B per rack level E, such as this is also schematically marked in FIG. 2. The storage regions B respectively comprise multiple physical receiving locations P for the reception of the storage objects 4. According to this embodiment, the rack storage system 1 further comprises a storage buffer device 7 with storage provisioning devices 8, which are arranged in provisioning levels located on top of one another and are respectively configured for the interim buffering of one storage object 4, or of multiple storage objects, 4. In this example, one provisioning level each is assigned to one rack level E each and is therefore not designated separately. Alternatively, however, a different assignment is possible. The provisioning devices 10 can comprise a driven conveying device, for example a roller conveyor.

According to this embodiment, the rack storage system 1 comprises, furthermore, a retrieval buffer device 9 with retrieval provisioning devices 10, which are arranged in provisioning levels located on top of one another and are respectively configured for the interim buffering of one storage object 4, or of multiple storage objects, 4. In this example, one provisioning level each is assigned to one rack level E each and is therefore not designated separately. Alternatively, however, a different assignment is possible also in this case. The provisioning devices 10 can comprise a driven conveying device, for example a roller conveyor.

According to this embodiment, the rack storage system 1 comprises multiple storage and retrieval units 11, which are moved in the rack aisle 5 between the first storage rack 3*a* and the second storage rack 3*b*. Specifically, the storage and retrieval units 11 are displaceable respectively on a horizontal travel plane in a longitudinal direction x in front of the storage regions B, in front of the storage provisioning devices 8 and in front of the retrieval provisioning devices 10. The longitudinal direction runs parallel to the longitudinal extension of the rack aisle 5. For this purpose, travel rails 25 can be provided in pairs per horizontal travel plane. A first travel rail 25 (see FIG. 2) per travel plane is affixed preferably to the vertical (front) uprights 6 of the first storage rack 3*a* and a second travel rail 25 per travel plane is affixed preferably to the vertical (front) uprights 6 of the second storage rack 3*b*. The travel rails 25 extend along the storage regions B and along the provisioning devices 8, 10 for storing storage objects 4 and retrieving storage objects 4.

The storage and retrieval units 11 respectively have a load handling device for storing and retrieving storage objects 4 (see also FIG. 2) and are configured for transporting the storage objects 4 from the storage provisioning devices 8 to the storage regions B and for transporting the storage objects 4 from the storage regions B to the retrieval provisioning devices 10. In other words, the connection, in terms of conveyor technology, of the storage provisioning devices 8 with the storage regions B and the connection, in terms of conveyor technology, of the storage regions B with the retrieval provisioning devices 10 is done via the storage and retrieval units 11.

WO 2016/168878 A1 describes one possible embodiment for such a storage and retrieval unit 11 (single-level storage and retrieval unit) and different embodiments of a load handling device for storing and retrieving storage objects 4.

In this example, one travel plane each is assigned to one rack level E each and is therefore not designated separately.

According to the embodiment shown, one storage and retrieval unit 11 each is assigned to each rack level E. Alternatively, there may also be fewer storage and retrieval units 11 than rack levels E. In this case, the storage and retrieval units 11 can be moved from one travel plane to another travel plane by a storage and retrieval units lift as described, for example, in AT 522 434 A1.

According to this embodiment, the rack storage system 1 further comprises a vertical storage conveying device 13 that is assigned to the rack aisle 5 and has multiple storage transport platforms 14*a*, 14*b* that are independently controllable and adjustable relative to the provisioning levels, and a storage conveying system for transporting storage objects 4 to the vertical storage conveying device 13, which storage conveying system is assigned to the rack aisle 5 and is adjoined, in terms of conveyor technology, to the vertical storage conveying device 13. Here, the storage objects 4 can be transported from the storage conveying system to the storage provisioning devices 8 by the storage transport platforms 14*a*, 14*b*. The storage objects 4 can be moved not only vertically but also horizontally using the storage transport platforms 14*a*, 14*b*. For this purpose, the storage transport platforms 14*a*, 14*b* respectively have a transport device, in this example roller conveyors. Yet, it would also be conceivable that the vertical storage conveying device 13 has only one storage transport platform 14*a*, or also more than two storage transport platforms 14*a*, 14*b*.

If multiple storage transport platforms 14*a*, 14*b* are provided, these are arranged vertically on top of one another on a storage guide assembly of the vertical storage conveying device 13 and can be adjusted independent of one another by an electronic control. The storage guide assembly for the storage transport platforms 14*a*, 14*b* can be configured on a stationary vertical storage mast 23, in particular on a single vertical storage mast 23, as this is the case in FIG. 1.

In this example, the storage conveying system comprises a first storage conveying device 16*a* in a first conveying plane F1 and a second storage conveying device 16*b* in a second conveying plane F2. Yet, it would also be conceivable that the storage conveying system has only one storage conveying device 16*a*.

According to this embodiment, the rack storage system 1 further comprises a vertical retrieval conveying device 17 that is assigned to the rack aisle 5 and has multiple retrieval transport platforms 18*a*, 18*b* that are independently controllable and adjustable relative to the provisioning levels, and a retrieval conveying system for transporting storage objects 4 by the vertical retrieval conveying device 17, which retrieval conveying system is assigned to the rack aisle 5 and is adjoined, in terms of conveyor technology, to the vertical retrieval conveying device 17, wherein the storage objects 4 can be transported from the retrieval provisioning devices 10 to the retrieval conveying system 19 by the retrieval transport platforms 18*a*, 18*b*. The storage objects 4 can be moved not only vertically but also horizontally using the retrieval transport platforms 18*a*, 18*b*. For this purpose, the retrieval transport platforms 18*a*, 18*b* respectively have a transport device, in this example roller conveyors. Yet, it would also be conceivable that the vertical retrieval conveying device 17 has only one retrieval transport platform 18*a*, or also more than two retrieval transport platforms 18*a*, 18*b*.

If multiple retrieval transport platforms 18*a*, 18*b* are provided, these are arranged vertically on top of one another on a retrieval guide assembly of the vertical retrieval conveying device 17 and can be adjusted independent of one another by an electronic control. The retrieval guide assembly for the retrieval transport platforms 18*a*, 18*b* can be configured on a stationary vertical retrieval mast 24, in particular on a single vertical retrieval mast 24, as this is the case in FIG. 1.

In this example, the retrieval conveying system comprises a first retrieval conveying device 20*a* in the first conveying plane F1 and a second retrieval conveying device 20*b* in the second conveying plane F2. Yet, it would also be conceivable that the retrieval conveying system 19 has only one retrieval conveying device 20*a*.

In the example shown, the storage buffer device 7 is arranged between the first storage rack 3*a* and the vertical storage conveying device 13, and the retrieval buffer device 9 is arranged between the second storage rack 3*b* and the vertical retrieval conveying device 17. Yet, generally, also a different arrangement is conceivable, in particular the storage side can be arranged on one front end of the rack aisle 5 and the retrieval side can be arranged on another front end of the rack aisle 5.

With respect to the embodiment of the vertical storage conveying device 13 and the vertical retrieval conveying device 17, WO 2020/113249 A1 and WO 2020/113254 A1 should be noted.

Finally, the rack storage system 1 comprises a computer system, in particular one or multiple computers, for example a control computer (of a programmable logic controller) and/or a material flow computer and/or a warehouse management computer. The storage conveying system, the retrieval conveying system, the vertical storage conveying device 13, the vertical retrieval conveying device 17, and the storage and retrieval unit(s) 11 are controlled by a control system and/or the computer system.

A warehouse management system 21 and/or the warehouse management computer (warehouse management system) is symbolically represented in FIG. 1. An electronic memory 22, which is symbolically represented in FIG. 1, is assigned to the warehouse management system 21. In particular, the warehouse management system 21 can comprise the memory 22, or be connected to a memory 22.

While, according to the embodiment above, a first vertical conveying device 13 for storing objects 4 and a second vertical conveying device 17 for retrieving storage objects 4 are provided, according to an embodiment that is not shown, a vertical conveying device may be provided which serves both to store objects 4 and also to retrieve storage objects 4. As described above, said vertical conveying device can comprise one or multiple transport platforms, which serve to store storage objects 4 and to retrieve storage objects 4.

Here, according to a first embodiment, the buffer device can comprise, on one of the sides of the vertical conveying device and in provisioning levels located on top of one another, the provisioning devices respectively for the interim buffering of one storage object 4, or of multiple storage objects, 4. The provisioning devices are arranged between the vertical conveying device and the first storage rack 3*a*, or second storage rack 3*b*. Some of the provisioning devices serve to store storage objects 4 and some of the provisioning devices serve to retrieve storage objects 4, or the provisioning devices, in a reversing operation, can respectively serve to store storage objects 4 or to retrieve storage objects 4 as and when needed.

Here, according to a second embodiment, the buffer device can comprise, at both sides of the vertical conveying device and in provisioning levels located on top of one another, the provisioning devices respectively for the interim buffering of one storage object 4, or of multiple storage objects, 4.

The provisioning devices which are arranged adjacent on the first side of the vertical conveying device then serve exclusively to store storage objects 4, and the provisioning devices which are arranged adjacent on the second side of the vertical conveying device then serve exclusively to retrieve storage objects 4.

Here, also the conveying system can comprise a conveying device for transporting storage objects 4 to the vertical conveying device and a conveying device for transporting storage objects 4 away from the vertical conveying device.

Various different embodiments of rack storage systems are described in WO 2013/090970 A2 and WO 2016/033628 A1, for example. It should be understood that these rack storage systems show merely examples, but the subject-matter of the invention is in no way limited to these.

It should also be noted that a rack storage system may comprise additional storage racks and rack aisles, for example ten storage racks and five rack aisles, which are respectively designed in accordance with the description above.

Accordingly, the described rack storage system in the different embodiments above can comprise

- a first storage rack 3*a* with uprights 6, rack levels E located on top of one another and a plurality of storage regions B, wherein at least some of the storage regions B comprise a plurality of physical receiving locations P,
- a second storage rack 3*b* with uprights 6, rack levels E located on top of one another and a plurality of storage regions B, wherein at least some of the storage regions B comprise a plurality of physical receiving locations P,
- a rack aisle 5 between the first storage rack 3*a* and the second storage rack 3*b*,
- a buffer device 7, 9 with provisioning devices 8, 10 respectively for the interim buffering of one storage object 4, or of multiple storage objects 4, of which first provisioning devices 8 serve to store storage objects 4 and second provisioning devices 10 serve to retrieve storage objects 4,
- one or multiple vertical conveying devices 13, 17 for storing storage objects 4 and retrieving storage objects 4, which one or multiple vertical conveying devices 13, 17 are respectively equipped with at least one transport platform 14*a* that is adjustable relative to the provisioning devices 8, 10, which comprise a transport device for storing storage objects 4 and/or retrieving storage objects 4,
- a conveying system that is adjoined to one or multiple vertical conveying devices and has a first conveying device for transporting (storing) storage objects 4 and a second conveying device for transporting (retrieving) storage objects 4,
- one or multiple storage and retrieval units 11, which are displaceable in the rack aisle 5, respectively on a horizontal travel track, in front of the storage regions B, in front of the provisioning devices 8, 10, which is/are configured for transporting the storage objects 4 from the provisioning devices 8 that serve to store storage objects 4 to the storage regions B and for transporting the storage objects 4 from the storage regions B to the provisioning devices 10 that serve to retrieve storage objects 4, and
- a warehouse management system 21, which is configured for executing the steps described below.

FIG. 2 shows a schematic representation of the rack storage system 1 according to FIG. 1, but with multiple storage regions B in x-direction and in a top view of a rack level E. For better clarity, the vertical storage conveying device 13, the vertical retrieval conveying device 17 and the conveying system for transporting storage objects 4 to be stored and transporting storage objects 4 to be retrieved are not represented. The rack storage system 1 comprises the storage racks 3*a*, 3*b* described above and the rack aisle 5 located therebetween, in which the storage and retrieval unit 11 is arranged so as to be displaceable in a longitudinal direction x. Specifically, the travel rails 25, on which wheels 26 of the storage and retrieval unit 11 can roll, are provided per travel plane. In addition, the storage and retrieval unit 11 has a load handling device 27 that can be telescopically extended on both sides and with the help of which the storage objects 4 can be stored in the storage racks 3*a*, 3*b* and retrieved from the storage racks 3*a*, 3*b*. In other words, storage objects 4 can be placed on physical receiving locations P in the storage region B, or removed from same, using the load handling device 27. Furthermore, storage objects 4 can be transported also in the longitudinal direction x with the load handling device 27 on the storage and retrieval unit 11 when the load handling device 27 is retracted.

FIGS. 3 to 9 are to explain in more detail the operation of the rack storage system 1 operated in an automated manner.

FIG. 3 shows multiple different storage region segmentations S1 . . . S3 assigned to a storage region B, which respectively comprise a plurality of virtual receiving locations P' for the storage objects 4 and specify a possible arrangement of the storage-object types inside said storage region B. Specifically, said assignment is done, in a first step a), in the electronic memory 22 of the warehouse management system 21. According to this example, the storage region segmentations S1 . . . S3 respectively differ from one another, among other things with respect to the size and/or the arrangement and/or the number of the virtual receiving locations P'. A storage region segmentation S1 . . . S3 can comprise multiple virtual receiving locations P', which virtual receiving locations P' form an identical, or different, dimension with respect to the size. In FIG. 3, the storage region segmentation S1 comprises virtual receiving locations P' of identical size, whereas the storage region segmentation S2, or the storage region segmentation S3, have virtual receiving locations P' of different sizes.

The number of the storage region segmentations S1 . . . S3 assigned to a storage region B is discretionary per se and may, of course, also exceed the number three.

Figure 4:
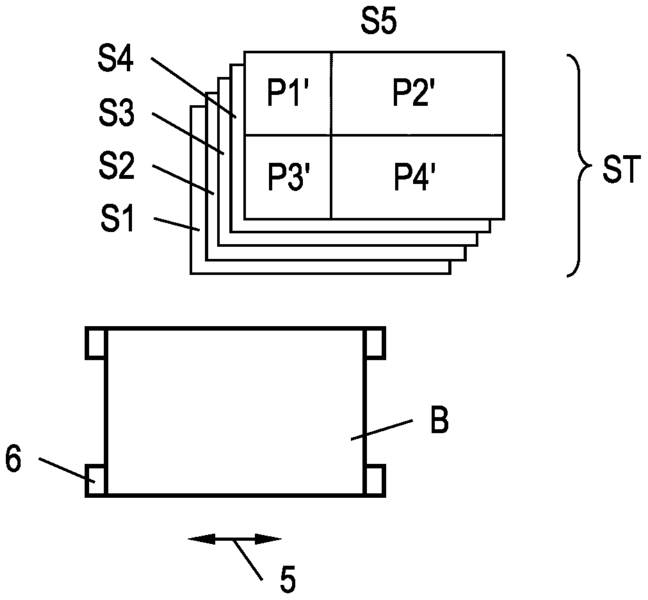

FIG. 4 shows a stack ST of multiple storage region segmentations S1 . . . S5 assigned to a storage region B, of which merely the storage region segmentation S5 is visible in detail. The storage region segmentation S5, in this example, comprises four virtual receiving locations P1' . . . P4' for the storage objects 4 and specifies a possible arrangement of the storage-object types inside said storage region B. The storage region segmentations S1 . . . S5 respectively differ from one another, among other things with respect to the size and/or the arrangement and/or the number of the virtual receiving locations P1' . . . P4'. A storage region segmentation S1 . . . S5 can comprise multiple virtual receiving locations P', which virtual receiving locations P' form an identical, or different, dimension with respect to the size. In FIG. 4, for example, the storage region segmentation S5 comprises virtual receiving locations P' of different sizes.

A stack ST of storage region segmentations S1 . . . S5 means essentially that a plurality of storage region segmentations S1 . . . S5 are assigned to the same storage region B. Preferably, all storage region segmentations S1 . . . S5 and/or any storage region segmentation S1 . . . S5 can be selected from the stack ST. The term stack ST alone, therefore, does not imperatively imply a "last in, first out" principle, in accordance with which merely a topmost storage region segmentation would be selectable. This applies to any and all embodiments described.

In a step b), the storage-object type of a storage object to be stored 4*a* is acquired, in particular by a sensor system for reading a data carrier, for example a barcode (not represented) or a sensor system for optically acquiring the storage-object type, for example dimensions of the storage object 4, or a sensor system for identifying the storage-object type by object recognition, in order to determine a storage object 4.

The storage-object type assigned to a storage object 4 is deposited, for example, in master data of the storage object 4. The data comprise the storage-object type, for example a length, width and/or height of a storage object 4. In this respect, reference is made to the above disclosure.

Alternatively, the acquiring of the storage-object type may comprise the direct determining of the storage-object type, in particular the determining of a length, width and/or height of a storage object 4, by the sensor system.

Figure 5:
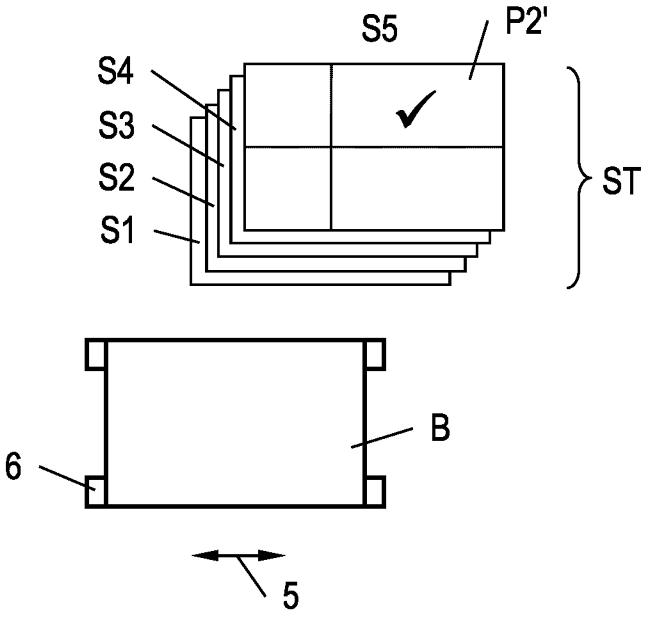

In a subsequent step c), a virtual receiving location P1' . . . P4' for the storage object 4*a* to be stored is selected in the plurality of storage region segmentations S1 . . . S5 by the warehouse management system 21, wherein the selected virtual receiving location P1' . . . P4' enables the storage of the storage-object type of said storage object 4*a*, i.e. offers a sufficient amount of space for this purpose and is not yet occupied. Preferably, in case of two virtual receiving locations P1' . . . P4' located one behind another which respectively enable the storage of the storage-object type of said storage object 4*a*, a rear receiving location, in particular viewed from the rack aisle 5, is selected first. In FIG. 5, the receiving location P2' of the storage region segmentation S5 is selected for this purpose.

Figure 6:
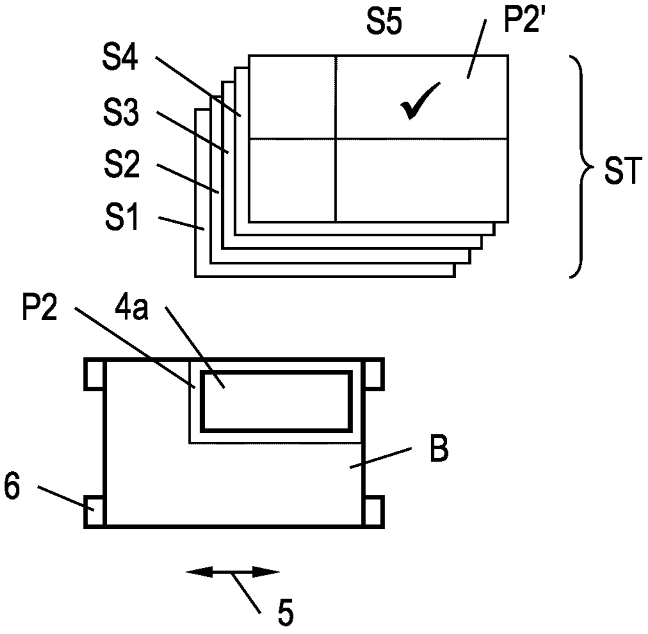

In a step d) represented in FIG. 6, the storage object 4*a* is stored on a physical receiving location P2 of the storage region B, which is assigned to and/or corresponds to the selected virtual receiving location P2', by the storage and retrieval unit 11 (see FIGS. 1 and 2).

In a step e), a status of the virtual receiving location P2' in the electronic memory 22, which specifies whether the assigned physical receiving location P2 is occupied by a storage object 4*a*, is changed from unoccupied (vacant) to occupied.

In a step f), the virtual receiving locations P1' . . . P5' of the storage region segmentations S1 . . . S5 assigned to the storage region B are limited to virtual receiving locations P1' . . . P4' which enable the storage of another storage object 4*a*. Here, on the one hand, the virtual receiving location P2' of the storage region segmentation S5 remains marked as occupied, as described above. On the other hand, the status of those virtual receiving locations of the other storage region segmentations S1 . . . S4 which are at least partially covered by the virtual receiving location P2' and/or overlap with same in the stack ST is also changed from unoccupied (vacant) to occupied and/or not available, as these do not enable any further storage of a storage object 4*a* of the storage-object type corresponding to the virtual receiving location.

Figure 7A:
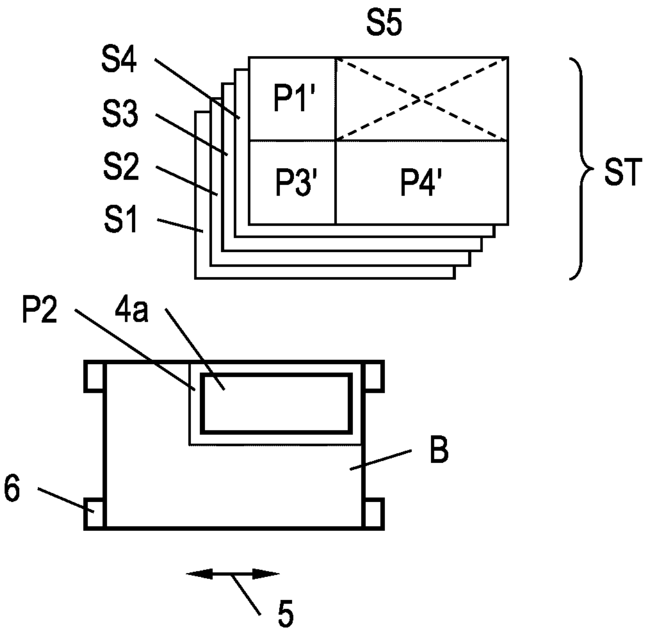

The result of the steps e) and f) is represented in FIG. 7*a*. As is readily apparent, the virtual receiving location P2' of the storage region segmentation S5 is designated as "occupied." Those virtual receiving locations (not represented) of the other storage region segmentations S1 . . . S4 which overlap with the virtual receiving location P2' and/or are at least partially covered by same are also designated as "occupied."

Alternatively, in step f), the storage region segmentations S1 . . . S5 assigned to the storage region B can be limited to one or multiple storage region segmentation(s) S1 . . . S5 which include the selected virtual receiving location P2' in the electronic memory 22. Also this limits available virtual receiving locations P1' . . . P5', wherein a number of the storage region segmentations S1 . . . S5 is simultaneously reduced.

Figure 7B:
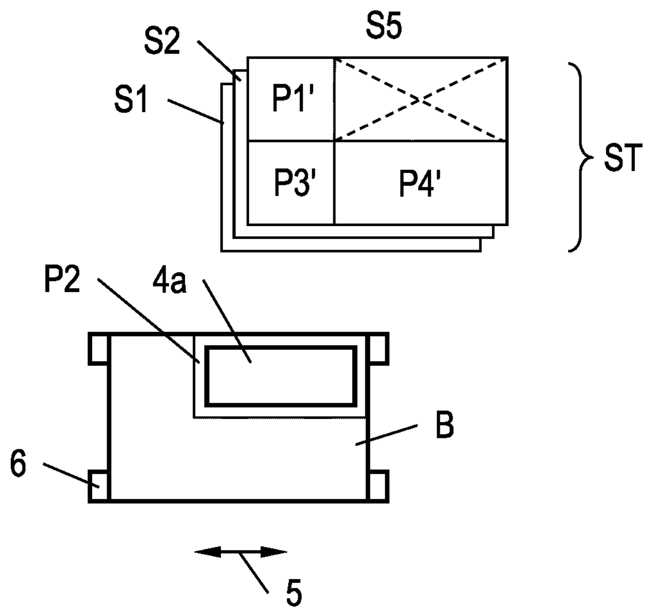

The result of the alternative step f) is represented in FIG. 7*b*. As is readily apparent, on the one hand, the virtual receiving location P2' is designated as "occupied" and, on the other hand, also the number of the possible storage region segmentations S1 . . . S5 has decreased. Specifically, in this example, the storage region segmentations S1, S2 and S5 remain, as it is assumed that the storage region segmentations S3 and S4 do not include the virtual receiving location P2'.

Figure 8A:
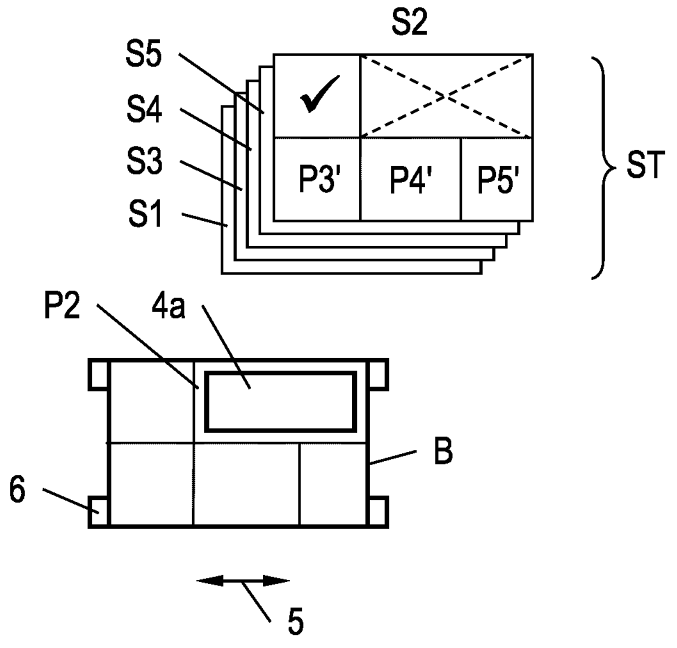
Figure 8B:
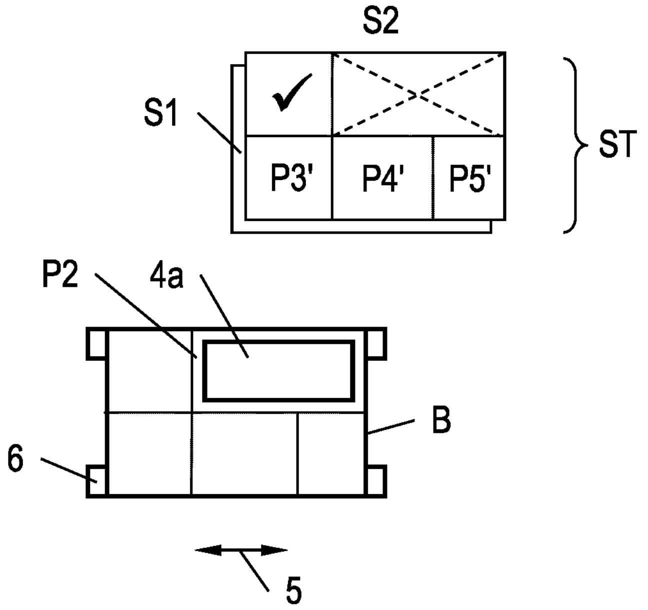

The steps b) to f) can then be repeated as and when needed. For example, FIG. 8*a* shows the selection of another virtual receiving location P1', yet now from the storage region segmentation S2, which comprises the virtual receiving locations P1' . . . P5'. The virtual receiving location P2' of the storage region segmentation S2 is already designated as "occupied," as it overlaps with the virtual receiving location P2' of the storage region segmentation P5, as can be gleaned from a combination of FIG. 7*a* and FIG. 8*a*. Further, the storage region segmentations S1 . . . S5 assigned to the storage region B may already be limited in accordance with the alternative step f) described above, as this is shown in FIG. 8*b*. Specifically, in this example, the storage region segmentations S1 and S2 remain.

Figure 9A:
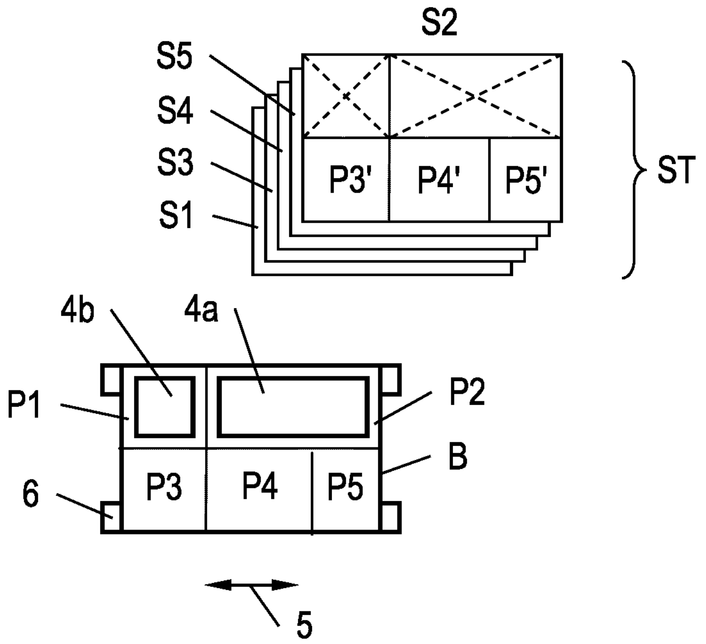
Figure 9B:
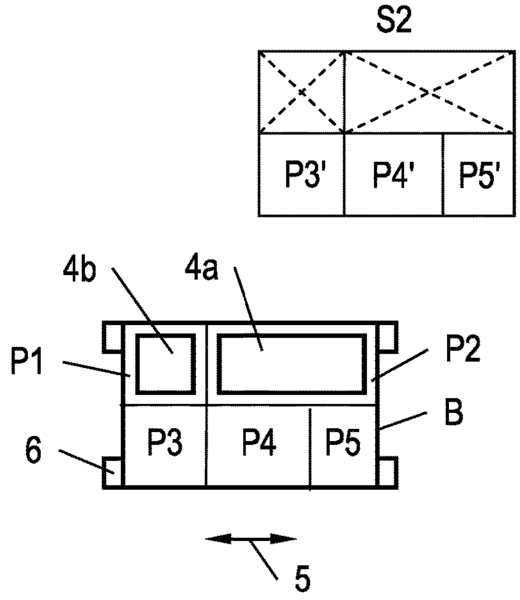

FIG. 9*a* finally shows the result of another run-through of the steps b) to f) after the storage of a storage object 4*b* on a physical receiving location P1. Analogously, FIG. 9*b* shows the result of another run-through of the steps b) to f) for the alternative step f).

It is generally of advantage if, in step c), the virtual receiving location P1' . . . P5', or the physical receiving location P1 . . . P5, is selected which offers the best use of space by the storage object 4*a*, 4*b*. As mentioned above, the storage object 4*a*, 4*b* is regularly smaller than the physical receiving location P1 . . . P5 on which it is stored. It is advantageous if the space inside the physical receiving location P1 . . . P5 not occupied by the storage object 4*a*, 4*b* is as small as possible. Here, the term "use of space" may refer either to the use of a one-dimensional width, a one-dimensional depth, a one-dimensional height, a two-dimensional surface (as in the examples represented in the FIGS.) or a three-dimensional space.

It would generally be conceivable that not only one storage region segmentation S5 of the storage region segmentations S1 . . . S5 offers a possible virtual receiving location P1' . . . P5' but multiple of the storage region segmentations S1 . . . S5, such as this is indicated in FIGS. 3 to 9 for the virtual receiving locations P1' . . . P3' in the storage region segmentations S2 and S5, for example. The selection of precisely one storage region segmentation S2, S5 can then be done in different manners.

Alternatively, it may also be provided that each possible virtual receiving location P1' . . . P5' is respectively provided in only one storage region segmentation of the storage region segmentations S1 . . . S5. Therefore, on the one hand, a combination of the virtual receiving locations P1' . . . P5' of the different storage region segmentations S1 . . . S5 and a low total number of storage region segmentations S1 . . . S5 enable a plurality of possible arrangements of storage-object types inside the storage region B to be mapped. On the other hand, an unambiguous allocation of a storage object 4*a*, 4*b* to a single virtual receiving location of the virtual receiving locations P1' . . . P5' and to a single storage region segmentation of the storage region segmentations S1 . . . S5 can be done. The virtual receiving locations P1' . . . P5' and the storage region segmentations S1 . . . S5, therefore, essentially form an unambiguous coordinate system inside the storage region B.

For example, as a criterion for the selection of a virtual receiving location P1' . . . P5' in step c), a maximum number of storage region segmentations S1 . . . S5 which remain after the limiting of the storage region segmentations S1 . . . S5 assigned to the storage region B in the, in particular alternative, step f) can be provided. In other words, the stack ST is to remain as high as possible. This results in a high flexibility for the storage of other storage objects 4*b*, as a large number of different options is then available.

Yet, it is also conceivable that, as a criterion for the selection of a virtual receiving location P1' . . . P5' in step c), a maximum number of virtual receiving locations P1' . . . P5' which remain in the storage region segmentations S1 . . . S5 assigned to the storage region B after the limiting of the virtual receiving locations P1' . . . P5' in step f) is provided. This results in a high storage capacity with respect to other storage objects to be stored 4*b*.

Generally, a virtual receiving location P1' . . . P5' can be selected according to one or multiple of the following criteria: turnover rate of the storage object 4 . . . 4*b*, even occupation of the storage racks 3*a*, 3*b* by storage objects 4 . . . 4*b*, accumulation of storage objects 4 . . . 4*b* of the same, or of a similar, storage-object type, filling level in a storage object 4 . . . 4*b* configured as loading aid, filling level of a storage region B, separation of (a) hazardous good(s) from non-hazardous storage objects 4 . . . 4*b*, transport route of a storage object 4 . . . 4*b* from a physical receiving location P1 . . . P5 to a delivery device, wherein the storage object 4 . . . 4*b* is transported on said transport route using the storage and retrieval unit 11, transport route of a storage object 4 . . . 4*b* from a receiving device (in accordance with the above embodiment, for example a provisioning device 8), to a physical receiving location P1 . . . P5, wherein the storage object 4 . . . 4*b* is transported on said transport route using the storage and retrieval unit 11, prioritization of rear physical receiving locations P1 . . . P5, or virtual receiving locations P1' . . . P5', in case of multiple physical receiving locations P1 . . . P5/virtual receiving locations P1' . . . P5' located one behind another, prioritization of larger front physical receiving locations P1 . . . P5, or virtual receiving locations P1' . . . P5', in case of multiple physical receiving locations P1 . . . P5/virtual receiving locations P1' . . . P5' located one behind another, minimization of the time required for storing by a storage and retrieval unit 11, maximization of the number of the storage objects 4 . . . 4*b* stored at a time by a storage and retrieval unit 11.

Said receiving device relates to the storage operation. In accordance with the embodiments above, the receiving device comprises, here, a buffer device with a plurality of provisioning devices 8, wherein a storage and retrieval unit 11 can pick up at least one storage object 4 . . . 4*b* from each provisioning device 14. Said delivery device relates to the retrieval operation. In accordance with the embodiments above, the delivery device comprises, here, a buffer device with a plurality of provisioning devices 10, wherein a storage and retrieval unit 11 can deliver at least one storage object 4 . . . 4*b* to each provisioning device 10. The storage and retrieval unit 11 is preferably a single-level storage and retrieval unit.

If a multi-level storage and retrieval unit is used instead of the single-level storage and retrieval unit 11, such as this is represented, for example, in WO 2016/141395 A1, FIGS. 1 and 2, the receiving device comprises, here, a buffer device (for the storage operation) with a provisioning device, wherein a storage and retrieval unit can pick up at least one storage object 4 . . . 4*b* from this provisioning device, and the delivery device comprises, here, a buffer device (for the retrieval operation) with a provisioning device, wherein a storage and retrieval unit can deliver at least one storage object 4 . . . 4*b* to this provisioning device. A storage conveying system comprises a conveying device for transporting conveying objects 4 to be stored, which forms the provisioning device. A retrieval conveying system comprises a conveying device for transporting conveying objects 4 to be retrieved, which forms the provisioning device. Such a multi-level storage and retrieval unit comprises at least one transport platform that can be moved on a vertical mast, wherein the vertical mast is arranged on a chassis, so that the transport platform can be moved in an x-direction and in a y-direction in order to store storage objects 4 . . . 4*b* on physical receiving locations P1 . . . P5 and remove them from receiving locations P1 . . . P5. The transport platform comprises, again, a load handling device, such as it is described above, for example.

If the transporting of the storage objects 4 . . . 4*b* to be stored and the transporting of the storage objects 4 . . . 4*b* to be retrieved is done using (autonomous) guided vehicles, the stationary conveying system for transporting the storage objects 4 . . . 4*b* to be stored and for transporting the storage objects 4 . . . 4*b* to be retrieved will be obsolete. The conveying system 15, 19 for transporting the storage objects 4 . . . 4*b* to be stored and for transporting the storage objects 4 . . . 4*b* to be retrieved will then comprise the (autonomous) guided vehicles. For a storage, the storage objects 4 . . . 4*b* are transported directly by a guided vehicle, or with an intermediate arrangement of a pick-up station, to the vertical conveying device 13, in particular the at least one transport platform 14*a*. For a retrieval, the storage objects 4 . . . 4*b* are transported by the vertical conveying device 17, in particular the at least one transport platform 18, directly to a guided vehicle, or with an intermediate arrangement of a pick-up station to a guided vehicle. The rack storage system 1 will then essentially comprise the storage racks 3*a*, 3*b*, one or multiple storage and retrieval units 11 (one or multiple single-level storage and retrieval units and one multi-level storage and retrieval unit) and the buffer devices, in particular the provisioning device, which serve to store conveying objects 4 . . . 4*b* and retrieve conveying objects 4 . . . 4*b*.

If the turnover rate of the storage object 4 . . . 4*b* is used as a criterion for the selection of a virtual receiving location P1' . . . P5', fast movers (A-Articles) can be stored rather in the vicinity of a receiving device, or delivery device, whereas slow movers (C-Articles) are stored rather further away from a receiving device, or delivery device. If a storage region B has multiple physical receiving locations P1 . . . P5 located one behind another, the rear physical receiving locations P1, P2 are advantageously occupied rather with slow movers (C-Articles), the front physical receiving locations P3, P4, P5 rather with fast movers (A-Articles). If a storage region B has multiple physical receiving locations P1 . . . P5 located one behind another, these can preferably also be occupied by storage objects 4 . . . 4*b* of the same, or of a similar, storage-object type. This enables the number of the storage objects 4 . . . 4*b* manipulated in a storage operation, or a retrieval operation, to be varied easily.

It would also be conceivable that the storage region segmentations S1 . . . S5 assigned to a storage region B are sorted on the basis of a sorting criterion, and the storage region segmentation S1 . . . S5 with the highest priority is selected in step c). In other words, in this case, the stack ST is sorted on the basis of a sorting criterion, wherein, for example, the storage region segmentation S2, S5 located at the very top has the highest priority, i.e. is preferably selected in step c). A sorting criterion may be, for example the number of the virtual receiving locations P1' . . . P5' contained in a storage region segmentation S1 . . . S5, wherein the priority increases with the number of the virtual receiving locations P1' . . . P5'. Accordingly, if possible, those storage region segmentations S1 . . . S5 are selected in which as many virtual receiving locations P1' . . . P5' and/or physical receiving locations P1 . . . P5 as possible remain vacant after the occupation of a physical receiving location P1 . . . P5 by the storage object 4 . . . 4*b* to be stored. In particular, also one or multiple of the criteria disclosed above can be used. The proposed measures ensure that the selection of a matching storage region segmentation S1 . . . S5 can be done particularly efficiently.

In the example represented in FIGS. 3 to 9, a virtual receiving location P1' . . . P5' and a physical receiving location P1 . . . P5 are defined in two dimensions x, z. A physical receiving location comprises a horizontal receiving surface, which is tentered in an x-direction and in a z-direction (perpendicular to the x-direction) between the uprights, in particular two front uprights and two rear uprights. Accordingly, also the storage-object type specifies the size of a storage object 4 . . . 4*b* in two dimensions.

Yet, alternatively, it is also possible that a virtual receiving location P1' . . . P5' and/or a physical receiving location P1 . . . P5 is defined in three dimensions x, y, z. A physical receiving location P1 . . . P5 comprises a horizontal receiving surface, which is tentered in an x-direction and in a z-direction (perpendicular to the x-direction) between the uprights 6, in particular two front uprights and two rear uprights, and defines a height in a y-direction (vertical to the receiving surface). Accordingly, the storage-object type specifies the size of a storage object 4 . . . 4*b* in three dimensions.

Alternatively, a physical receiving location P1 . . . P5 may define only one dimension x, y, z. This may be the case if article(s) merely with different lengths but with a uniform width is/are stored.

A virtual receiving location P1' . . . P5' is the digital copy and/or the digital image of the respective physical receiving location P1 . . . P5.

Furthermore, the storage-object type can comprise other properties of the storage object 4 . . . 4*b*, for example whether it is (an) article(s) directly or a loading aid, whether it is a fast mover or a slow mover, and so forth.

The storage objects 4 . . . 4*b* can also be stacked on top of one another. In case of two-dimensional virtual receiving locations P1' . . . P5', the limit of these virtual receiving locations P1' . . . P5' extends upwards (i.e. in y-direction), whereas the segmentation of three-dimensional virtual receiving locations P1' . . . P5' may look different in different planes.

It should also generally be noted that, while the use of rectangular and/or cuboid virtual receiving locations P1' . . . P5' and physical receiving locations P1 . . . P5 is of advantage in most applications, the virtual receiving locations P1' . . . P5' and physical receiving locations P1 . . . P5 may have any configuration with respect to their shape.

It should also be noted in this context that the steps d), e) and f) need not imperatively be executed in the sequence specified above, but they can also be executed in a different order, for example in the sequence e)→d)→f) or e)→f)→d) or d)→f)→e). Accordingly, also the statuses represented in FIGS. 6 and 7 would have to be regrouped in terms of time.

It is also of advantage if the step f) is executed in the same manner for other storage regions B1 . . . B3, in particular for adjacent and/or opposite storage regions B1 . . . B3, such as this is the case in the example represented in FIG. 10. In this example, the virtual receiving location P2' and/or the physical receiving location P2 for storing the storage object 4 is selected. In accordance with this embodiment variant, step f) is then executed not only for the storage region B1 but in the same manner also for the storage regions B2 and B3. Accordingly, not only the stack ST of possible storage region segmentations S1 . . . S5 reduces but also the stack ST' of the storage region B2 and the stack ST" of the storage region B3. In particular, the embodiment variant relates to storage regions B1, B3 located opposite each other in a rack aisle 5. This means that step f) is executed in the same manner, in particular for a storage region B3 located opposite in the rack aisle 5. Using the proposed measures, physical receiving locations P1 . . . P5 in a storage region B2, B3 which enables the simple rearranging of storage objects 4, for example, can be kept vacant. With a rising filling level in one of the storage racks 3*a*, 3*b*, or if the storage objects 4 are given different priorities, a redistribution of storage objects 4, i.e. a rearranging of storage objects 4 from one physical receiving location P1 . . . P5 to another, or from one storage region B1 . . . B3 (in the same storage rack 3*a* or in another storage rack 3*b*) to another, may be necessary or useful. The execution of step f) for adjacent storage regions B1 . . . B3 results in a high probability of a vacant physical receiving location P2 which enables the (temporary) storage of the storage object 4. A resorting of the storage objects 4 can therefore be executed in an efficient manner. For example, such a rearranging operation can be executed at off-peak times, for example during the night.

During a rearranging operation, in which already-stored storage objects 4 are rearranged to another physical receiving location P1 . . . P5, after the removal of a storage object 4 from its original physical receiving location P1 . . . P5 and during the storing on the other physical receiving location P1 . . . P5, advantageously, the steps b) to f) are executed. Advantageously, also the criteria already mentioned further above can be taken into account.

It is also conceivable that the steps b) to f) are executed for multiple storage objects 4*a*, 4*b* at a time, wherein the storage objects 4*a*, 4*b*, in step c), are stored in a single storage region segmentation S1 . . . S5, or in multiple storage region segmentations S1 . . . S5, and, in step d), are stored in a single storage region B, such as this is represented in FIG. 11. This variant is of advantage whenever more than one storage object 4*a*, 4*b* can be stored by the storage and retrieval unit 11 in one step and/or in a single storage operation.

In particular, it is of advantage here if the physical receiving locations P1 . . . P5 of the storage objects 4*a*, 4*b* are arranged one behind another in a storage direction z, viewed from the storage and retrieval unit 11, such as this is also represented in FIG. 11. In this manner, the storage and retrieval unit 11 can stop at a position x when multiple storage objects 4*a*, 4*b* are stored.

It is also particularly advantageous if multiple storage region segmentations S1 . . . S5 are combined to a meta segmentation M1 . . . M3, wherein, in step c), a virtual receiving location P1' . . . P5' is first selected in the plurality of meta segmentations M1 . . . M3 and a virtual receiving location P1' . . . P5' is then selected in the plurality of storage region segmentations S1 . . . S5 of the selected meta segmentation M1 . . . M3, and in step f), the meta segmentations M1 . . . M3 assigned to the storage region are limited, in the electronic memory 22 of the warehouse management system 21, to one or multiple meta segmentation(s) M1 . . . M3 which include the selected virtual receiving location.

FIG. 12 shows an example of this. If the stack ST of the storage region segmentations S1 . . . S5 assigned to a storage region B becomes very large, the search for a suitable virtual receiving location P1' . . . P5' for a storage object 4 . . . 4*b* can be time-consuming. Therefore, it is of advantage in such a case to form meta segmentations M1 . . . M3, i.e. groups of the storage region segmentations S1 . . . S5. Here, the groups are formed, for example, according to the existence of specific virtual receiving locations P1' . . . P5'. For example, the meta segmentation M1 may comprise the virtual receiving locations P1', P2', the meta segmentation M2 may comprise the virtual receiving locations P3', P5' and the meta segmentation M3 may comprise the virtual receiving locations P1', P5'. The meta segmentations M1 . . . M3 may comprise mutually exclusive storage region segmentations S1 . . . S5 or, as this is the case in FIG. 12, form intersecting regions.

If a virtual receiving location P1' . . . P5' suitable for a storage object 4 . . . 4*b* is to be selected in step c), the search in the meta segmentation M1 . . . M3 will be started. It is assumed, in our example, that the virtual receiving location P3' is suitable. Accordingly, it is established, in a first step, that (only) the meta segmentation M2 has such a virtual receiving location P3'. Subsequently, the search is continued (only) in the storage region segmentations S1 . . . S5 that are included in the meta segmentation M2. It becomes clear from the above that the search for a suitable virtual receiving location P1' . . . P5' for a storage object 4 . . . 4*b* and/or the selection for a suitable virtual receiving location P1' . . . P5' for a storage object 4 . . . 4*b* is cut short, as not the entire stack ST of storage region segmentations S1 . . . S5 need be searched.

It should also be noted that, according to an embodiment that is not shown, the rack storage system 1 may also comprise merely a single storage rack 3*a*, 3*b* for receiving multiple storage objects 4 of different storage-object types. This storage rack 3*a*, 3*b* comprises uprights 6 and rack levels E located on top of one another and a plurality of storage regions B, B1 . . . B3, as described above. The storage regions B are respectively arranged between two uprights 6 spaced apart from each other in a longitudinal direction x of the storage rack 3*a*, 3*b*. According to this embodiment, the rack storage system 1 comprises at least one storage and retrieval unit 11 for storing the storage objects 4, which is displaceable in the longitudinal direction x of the storage rack. The rack storage system 1 also comprises a warehouse management system 21, to which an electronic memory 22 is allocated, as described above.

The number of the storage regions B may vary, depending on the length and/or height of the storage racks 3*a*, 3*b*.

Even if, according to the embodiments above, the storage rack, or the storage racks, are stationary, it is also possible that a mobile storage rack, or a plurality of mobile storage racks, are provided. The mobile storage rack, or the mobile storage racks, are respectively configured for receiving multiple storage objects 4 of different storage-object types and comprise uprights 6 and rack levels E located on top of one another and a plurality of storage regions B, B1 . . . B3. Also, according to this embodiment, at least one storage and retrieval unit that is displaceable in the longitudinal direction x of the storage rack can be used for storing the storage objects 4, which storage and retrieval unit can be moved on a travel surface and independent of the storage rack. The at least one storage and retrieval unit is an autonomous transport vehicle, for example an AMR (autonomous mobile robot) or an AGV (automated guided vehicle), which comprises a load handling device for storing the storage objects 4. The load handling device comprises, for example, a jointed-arm robot, which is provided on the transport vehicle, and a holding location, on which at least one storage object 4 can be received for transport.

FIG. 13 shows an example of an alternative storage region segmentation S6 with a round and/or cylindrical shape for virtual receiving locations P1' . . . P4' and physical receiving locations P1 . . . P4. This can be advantageous for a storage of storage objects 4, 4*a*, 4*b* with a round shape, in particular for storage objects 4, 4*a*, 4*b* of a storage-object type whose diameter amounts to, or exceeds, at least one half of a depth in z-direction, or one half of a width in x-direction (not represented), of the storage region B, B1 . . . B3, as in the example shown. The stack ST of storage region segmentations S1 . . . S5 described above may comprise storage region segmentations S1 . . . S5 with a rectangular and/or cuboid shape and storage region segmentations S1 . . . S5 with an alternative shape, in particular with a round or cylindrical shape and with shapes based on polygons or ovals.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted devices can also comprise more, or also fewer, components than depicted. In some cases, the shown devices and/or their components may not be depicted to scale and/or be enlarged and/or reduced in size.

| List of reference numbers | |
|---|---|
| 1 | rack storage system |
| 3a, 3b | storage rack |
| 4, 4a, 4b | storage object |
| 5 | rack aisle |
| 6 | uprights |
| 7 | storage buffer device |
| 8 | storage provisioning device |
| 9 | retrieval buffer device |
| 10 | retrieval provisioning device |
| 11 | storage and retrieval unit (shuttle) |
| 13 | vertical storage conveying device |
| 14a, 14b | storage transport platform |
| 16a, 16b | storage conveying device |
| 17 | vertical retrieval conveying device |
| 18a, 18b | retrieval transport platform |
| 20a, 20b | retrieval conveying device |
| 21 | warehouse management system |
| 22 | electronic memory |
| 23 | vertical storage mast |
| 24 | vertical retrieval mast |
| 25 | travel rail |
| 26 | wheel |
| 27 | load suspension device |

-continued

| List of reference numbers | |
|---|---|
| B, B1 . . . B3 | storage region |
| E | rack level |
| F1, F2 | conveying plane |
| M1 . . . M3 | meta segmentation |
| P, P1 . . . P5 | physical receiving location |
| P', P1' . . . P5' | virtual receiving location |
| S1 . . . S6 | storage region segmentation |
| ST, ST' . . . ST" | stack of storage region segmentations |
| x | longitudinal direction/longitudinal extension (of the rack aisle) |
| y | vertical direction/vertical extension (of the storage rack) |
| z | transverse direction/transverse extension (of the rack aisle) |

The invention claimed is:

1. A method for storing multiple storage objects of different storage-object types in a storage rack comprising uprights, rack levels located on top of one another and a plurality of storage regions, wherein the storage regions are respectively arranged between two uprights spaced apart from each other in a longitudinal direction of the storage rack, wherein storing of the storage objects is controlled by a warehouse management system, and wherein an electronic memory is allocated to the warehouse management system, the method further comprising the following steps:

a) assigning multiple storage region segmentations to a storage region of the storage regions in the electronic memory for the plurality of storage regions, wherein the storage region segmentations respectively comprise a plurality of virtual receiving locations for the storage objects and specify a possible arrangement of the storage-object types inside the storage region, b) acquiring the storage-object type of a storage object to be stored, c) selecting a virtual receiving location for the storage-object type of the storage object to be stored in the plurality of storage region segmentations by the warehouse management system, wherein the virtual receiving location enables the storage of the storage-object type of the storage object, and wherein in case of multiple virtual receiving locations located one behind another, the virtual receiving location is selected according to a criterion of a prioritization of rear virtual receiving locations, d) storing the storage object on a physical receiving location of the storage region which is assigned to the selected virtual receiving location by a storage and retrieval unit displaceable in the longitudinal direction of the storage rack, e) changing a status of the virtual receiving location in the electronic memory, which specifies whether the assigned physical receiving location is occupied by a storage object, from unoccupied to occupied, f) limiting the virtual receiving locations in the storage region segmentations assigned to the storage region to virtual receiving locations which enable the storage of another storage object on a physical receiving location, in the electronic memory, and g) repeating the steps b) to f).

2. The method according to claim 1, wherein the limiting of the virtual receiving locations in step f) comprises a limiting of the storage region segmentations assigned to the storage region to one, or multiple; storage region segmentation(s) which include the selected virtual receiving location, in the electronic memory.

3. The method according to claim 1, wherein the virtual receiving location is further selected according to a criterion of a maximum number of virtual receiving locations which remain after the limiting of the virtual receiving locations in step f) is provided.

4. The method according to claim 2, wherein the virtual receiving location is further selected according to a criterion of a maximum number of storage region segmentations which remain after the limiting of the storage region segmentations assigned to the storage region in step f) is provided.

5. The method according to claim 1, wherein the virtual receiving location is further selected according to at least one of the following criteria: turnover rate of the storage object, even occupation of the rack storage system by storage objects, accumulation of storage objects of the same or of a similar storage-object type, filling level in a storage object configured as loading aid, filling level of a storage region, separation of a hazardous good from non-hazardous storage objects, transport route of a storage object from the physical receiving location to a delivery device, wherein the storage object is transported on the transport route by the storage and retrieval unit, transport route of a storage object from a receiving device to the physical receiving location, wherein the storage object is transported on the transport route by the storage and retrieval unit, in case of multiple virtual receiving locations located one behind another, prioritization of larger front virtual receiving locations, minimization of the time required for storing by the storage and retrieval unit, maximization of the number of the storage objects stored at a time by the storage and retrieval unit.

6. The method according to claim 5, wherein at least one of the criteria are taken into account during a rearranging operation, in which already-stored storage objects are rearranged to another physical receiving location, wherein the steps b) to f) are executed after the removal of a storage object from the original physical receiving location during the storing on the other physical receiving location.

7. The method according to claim 1, wherein steps b) to f) are executed for multiple storage objects at a time, wherein the storage objects are stored in one; or multiple; has storage region segmentation(s) in step c) and in a single storage region in step d), wherein the storage and retrieval unit are configured for storing more than one storage object in a single step.

8. The method according to claim 7, wherein the physical receiving locations of the storage objects are arranged one behind another in a storage direction.

9. The method according to claim 1, wherein:

multiple storage region segmentations are combined to a meta segmentation, wherein, in step c), a virtual receiving location is first selected in the plurality of meta segmentations and a virtual receiving location is then selected in the plurality of storage region segmentations of the selected meta segmentation, and in step f), the meta segmentations assigned to the storage region are limited, in the electronic memory, to one; or multiple; meta segmentation(s) which include the selected virtual receiving location.

10. The method according to claim 1, wherein the storage region segmentations assigned to a storage region are sorted on the basis of a sorting criterion, and the storage region segmentation that comprises the selected virtual receiving location and has the highest priority is selected in step c).

11. The method according to claim 1, wherein the virtual receiving location that offers the best use of space by the storage object is selected in step c).

12. The method according to claim 1, characterized in that the step f) is executed in the same manner for other storage regions.

13. A rack storage system, comprising:

at least one storage rack for receiving multiple storage objects of different storage-object types, wherein the at least one storage rack comprises uprights, rack levels located on top of one another and a plurality of storage regions, wherein the storage regions are respectively arranged between two uprights spaced apart from each other in a longitudinal direction of the storage rack, at least one storage and retrieval unit for storing the storage objects that is displaceable in the longitudinal direction of the storage rack, and a warehouse management system, wherein an electronic memory is allocated to the warehouse management system, wherein the warehouse management system is configured for executing the following steps:

a) assigning multiple storage region segmentations to a storage region of the storage regions in the electronic memory for the plurality of storage regions, wherein the storage region segmentations respectively comprise a plurality of virtual receiving locations for the storage objects and specify a possible arrangement of the storage-object types inside the storage region, b) acquiring the storage-object type of a storage object to be stored, c) selecting a virtual receiving location for the storage-object type of the storage object to be stored in the plurality of storage region segmentations, wherein the virtual receiving location enables the storage of the storage-object type of the storage object, and wherein in case of multiple virtual receiving locations located one behind another, the virtual receiving location is selected according to a criterion of a prioritization of rear virtual receiving locations, d) controlling the storage and retrieval unit for the purpose of storing the storage object on a physical receiving location of the storage region which is assigned to the selected virtual receiving location, e) changing a status of the virtual receiving location in the electronic memory, which specifies whether the assigned physical receiving location is occupied by a storage object, from unoccupied to occupied, f) limiting the virtual receiving locations in the storage region segmentations assigned to the storage region to virtual receiving locations which enable the storage of another storage object on a physical receiving location, in the electronic memory, and g) repeating the steps b) to f).

14. The rack system according to claim 13, wherein the limiting of the virtual receiving locations in step f) comprises a limiting of the storage region segmentations assigned to the storage region to at least one storage region segmentation which includes the selected virtual receiving location, in the electronic memory.

15. A rack storage system, comprising:

at least one storage rack for receiving multiple storage objects of different storage-object types, wherein the at least one storage rack comprises uprights, rack levels located on top of one another and a plurality of storage regions, wherein the storage regions are respectively arranged between two uprights spaced apart from each other in a longitudinal direction of the storage rack, at least one storage and retrieval unit or storing the storage objects that is displaceable in the longitudinal direction of the storage rack, and a warehouse management system having electronic memory, the warehouse management system is configured for executing the following steps:

a) assigning multiple storage region segmentations to a storage region of the storage regions in the electronic memory for a plurality of storage regions, b) acquiring a storage-object type of a storage object to be stored, c) selecting a virtual receiving location for the storage-object type of the storage object to be stored in the plurality of storage region segmentations, and wherein in case of multiple virtual receiving locations located one behind another, the virtual receiving location is selected according to a criterion of a prioritization of rear virtual receiving locations, d) controlling the storage and retrieval unit for the purpose of storing the storage object on a physical receiving location of the storage region, e) changing a status of the virtual receiving location in the electronic memory, and f) limiting the virtual receiving locations in the storage region segmentations assigned to the storage region to virtual receiving locations.

* * * * *